(12) United States Patent
Lv et al.

(10) Patent No.: US 11,196,319 B2
(45) Date of Patent: Dec. 7, 2021

(54) DRIVER CABINET STRUCTURE

(71) Applicant: OKIN REFINED ELECTRIC TECHNOLOGY CO., LTD, Zhejiang (CN)

(72) Inventors: Zuochao Lv, Zhejiang (CN); Chenjian Lei, Zhejiang (CN); Long Li, Zhejiang (CN); Minglong Lei, Zhejiang (CN); Haoxiang Zhu, Zhejiang (CN)

(73) Assignee: OKIN REFINED ELECTRIC TECHNOLOGY CO., LTD, Zhejiang (CN)

( * ) Notice: Subject to any disclaimer, the term of this patent is extended or adjusted under 35 U.S.C. 154(b) by 213 days.

(21) Appl. No.: 16/462,545

(22) PCT Filed: Mar. 1, 2019

(86) PCT No.: PCT/CN2019/076605
§ 371 (c)(1),
(2) Date: May 21, 2019

(87) PCT Pub. No.: WO2020/010855
PCT Pub. Date: Jan. 16, 2020

(65) Prior Publication Data
US 2021/0111605 A1 Apr. 15, 2021

(30) Foreign Application Priority Data

Jul. 11, 2018 (CN) .......................... 201810758425.7
Jul. 11, 2018 (CN) .......................... 201821095812.9

(51) Int. Cl.
H02K 5/14 (2006.01)
H02K 5/16 (2006.01)
H02K 5/22 (2006.01)

(52) U.S. Cl.
CPC ................. *H02K 5/14* (2013.01); *H02K 5/16* (2013.01); *H02K 5/22* (2013.01)

(58) Field of Classification Search
CPC ............... H02K 5/14; H02K 5/16; H02K 5/22
USPC .................................... 310/12.01, 72, 49.01
See application file for complete search history.

(56) References Cited

FOREIGN PATENT DOCUMENTS

CN 205248944 U * 5/2016

* cited by examiner

Primary Examiner — Tulsidas C Patel
Assistant Examiner — Riley Owen Stout
(74) Attorney, Agent, or Firm — JCIP Global Inc.

(57) ABSTRACT

A driver cabinet structure includes an upper driver cabinet, a lower driver cabinet, a motor front-end cover and a motor brush rack plate, wherein the motor front-end cover is disposed on the lower driver cabinet; the motor front-end cover is provided with the motor brush rack plate thereon and screw holes on a lateral surface; the motor brush rack plate is provided with brush holders thereon and a through hole in the center; front and rear ends of each of the brush holders are both open and intercommunicated; a limit step is disposed in the through hole; lug bosses are disposed on the limit step; and the lower driver cabinet, the motor front-end cover, the motor brush rack plate and the brush holders are integrally formed.

10 Claims, 2 Drawing Sheets

DRIVER CABINET STRUCTURE

CROSS-REFERENCE TO RELATED APPLICATION

This is a 371 application of the International PCT application Ser. No. PCT/CN2019/076605, filed on Mar. 1, 2019, which claims the priority benefits of China Application No. 2018107584257, filed on Jul. 11, 2018, and China Application No. 2018210958129, filed on Jul. 11, 2018. The entirety of each of the above-mentioned patent applications is hereby incorporated by reference herein and made a part of this specification.

FIELD OF TECHNOLOGY

The present invention relates to the technical field of drivers, in particular to a driver cabinet structure.

BACKGROUND

An existing push rod driver is assembled by a rotor assembly with a worm screw, a stator assembly, a brush rack plate assembly, a front-end cover assembly, a rear-end cover assembly, a worm wheel transmission assembly, a cabinet, a cabinet cover, an aluminum alloy guide rail and other components. The brush rack assembly is installed on the front-end cover via screws or rivets; a brush holder and a brush rack plate are also connected via screws, rivets or clamps. The front-end cover assembly, the rear-end cover assembly, the rotor assembly, the stator assembly and a shell are first assembled to be a motor, and are then assembled on the cabinet by screws; the brush holder is installed separately, and requires a matched brush holder rack. Such a structure has poor coupling precision, low product consistency and complex assembly procedures, consumes large amount of time and manpower, and has a high cost.

The existing brush holder structure is: one end facing the motor is open, and the other is closed; in the assembly procedures of the push rod driver, a carbon brush is first installed, and then a rotor is pressed in; the assembly requires the cooperation of two men/women; the process is very easy to damage the carbon brush, and causes unnecessary rework and material loss, thus wasting manpower and resources.

A bearing at the front end of an existing motor rotor is directly installed on the rotor; an end surface of a bearing outer ring is limited by a punching front-end cover, and the other end is limited by an injection-molded cabinet, thus the precision is poor and the bearing gap is too large, which would influence the performances of the motor after frequent daily use; with no special axial fixer, the bearing would axially move after frequent daily use, which would influence the performances of the motor, thus causing inconvenience to a user, and increasing the after-service maintenance cost of a manufacturer.

A driver generally requires a self-locking function during use, for example, a table can stop at any height during elevation. For a driver structure with a slow elevation speed, since the spiral angle of a screw thereof is smaller than a self-locking angle and/or the spiral angle of a worm screw thereof is smaller than the self-locking angle, the driver per se has a self-locking function. However, for an electric push rod with a long stroke and a quick speed, a steep lead is required, and the designed spiral angle is greater than the self-locking angle, therefore, a self-locking member is required on the driver to improve the self-locking function of the driver. However, the existing steep lead drivers having a self-locking function have a high cost and are easy to damage.

SUMMARY

The object of the present invention is to provide a driver cabinet structure to solve the technical problems of numerous components, complex assembly procedures, easy damage to the carbon brush during assembly, the move danger of a rotor bearing and defective driver self-locking function in an existing push rod driver.

To achieve the above object, the present invention adopts the following technical solution:

A driver cabinet structure, includes an upper driver cabinet and a lower driver cabinet, and characterized by further including a motor front-end cover and a motor brush rack plate, wherein the motor front-end cover is disposed on the lower driver cabinet; the motor front-end cover is provided with the motor brush rack plate thereon and screw holes on a lateral surface; the motor brush rack plate is provided with brush holders thereon and a through hole in the center; front and rear ends of each of the brush holders are both open and intercommunicated; a limit step is disposed in the through hole; lug bosses are disposed on the limit step; and the lower driver cabinet, the motor front-end cover, the motor brush rack plate and the brush holders are integrally formed.

The driver cabinet structure is characterized in that the upper driver cabinet, the lower driver cabinet, the motor front-end cover, the motor brush rack plate and the brush holders are integrally formed.

The driver cabinet structure is characterized in that each of the brush holders is cooperatively connected with a brush holder end plug.

The driver cabinet structure is characterized in that each of the brush holder end plugs is detachably connected with each of the brush holders.

The driver cabinet structure is characterized in that the brush holder end plugs and the brush holders are integrally formed.

The driver cabinet structure is characterized by further including a damping member, wherein the damping member is coupled with the through hole, and is provided on the edge with notches coupled with the lug bosses.

The driver cabinet structure is characterized in that the number of the notches is an integral multiple of the number of the lug bosses.

The driver cabinet structure is characterized in that at least two screw holes are symmetrically disposed on a lateral surface of the motor front-end cover, and at last two brush holders are symmetrically disposed on the motor brush rack plate.

The driver cabinet structure is characterized in that at least one lug boss is disposed on the limit step.

The driver cabinet structure is characterized in that slide rail installation ports coupled with each other are formed on the upper driver cabinet and the lower driver cabinet respectively.

The driver cabinet structure is characterized in that a motor shell is cooperatively disposed at the bottom of the motor front-end cover; a radially arranged installation hole is formed on the motor front-end cover; a rim enclosing a half of the installation hole is disposed on the periphery of the installation hole; an installation coupling through hole is formed on a sidewall of the motor shell; a flange surrounding the installation coupling through hole is disposed on an inner wall of the sidewall of the motor shell; the rim is provided with an opening for moving in and out the flange; when the motor shell and the motor front-end cover are installed together, the flange moves in from the opening, and is then limited by the rim; and a fastener penetrates through the installation coupling through hole and the installation hole to fixedly connect the motor front-end cover to the motor shell.

The driver cabinet structure is characterized in that the rim is of a U shape, and an outer diameter of the flange is slightly smaller than an internal space of the rim.

The beneficial effects of the present invention: the present invention has a reasonable structure and a smart design; the coupling precision and product consistency of the driver cabinet are improved, the assembly procedures are reduced, and the cost is saved; the two ends of each of the brush holders are open and in assembly, a rotor can be pressed in first and then a carbon brush is assembled, thus preventing the damage of the carbon brush, saving materials, and improving production efficiency; the provided screw holes are coupled with screws to reinforce a rotor bearing, so that the bearing is prevented from axially moving; and with a damping member, the self-locking function of a driver is improved, and thus the problems of high cost and easy damage of an existing steep-lead driver having the self-locking function are solved; the coupling structure between the motor front-end cover and the motor shell realizes quick motor installation, and the installation structure is stable and reliable.

DESCRIPTION OF THE EMBODIMENTS

The present invention will be further described hereafter in connection with the drawings.

Figure 1:
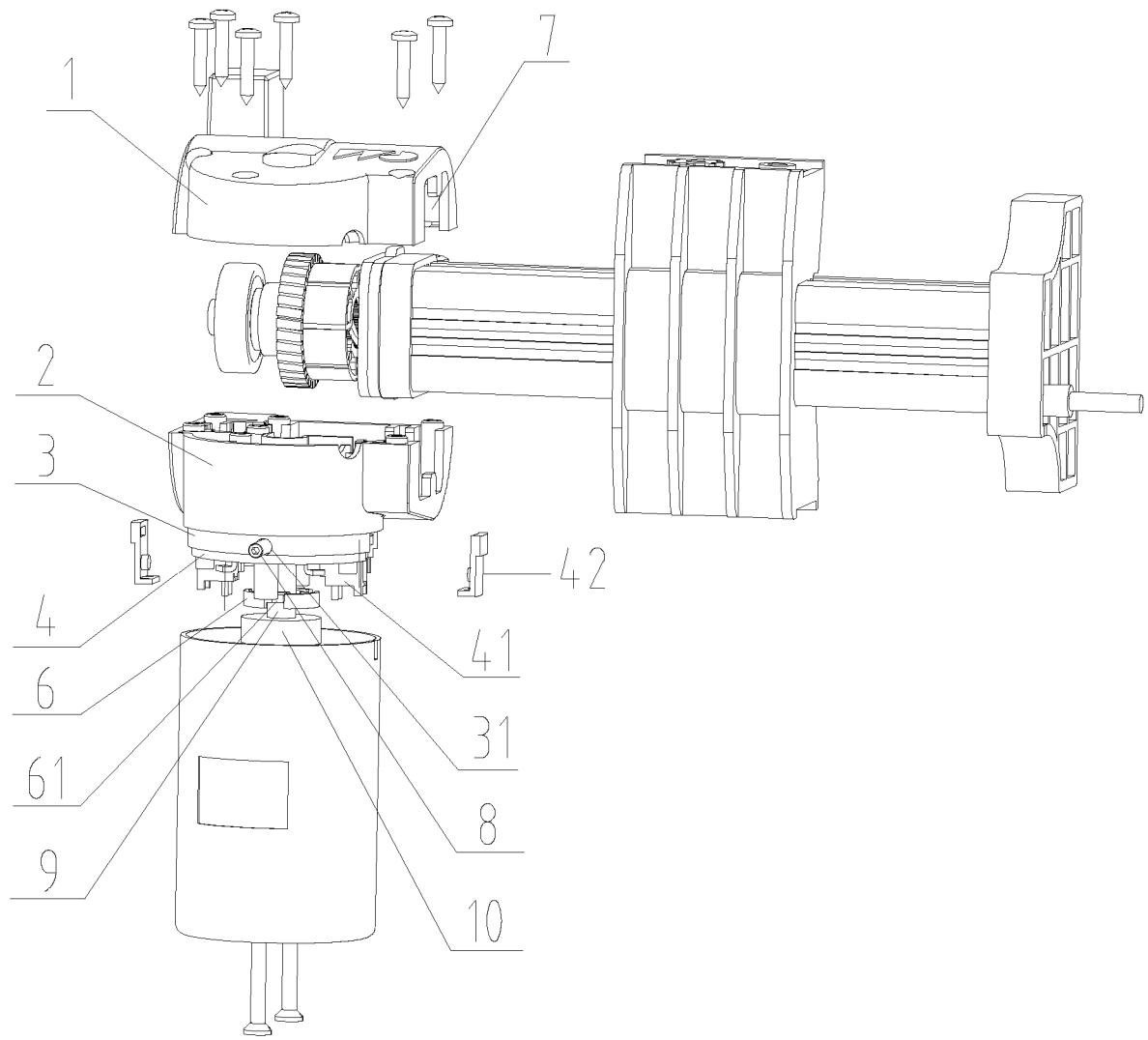
FIG. 1 is an exploded view of the present invention.
Figure 2:
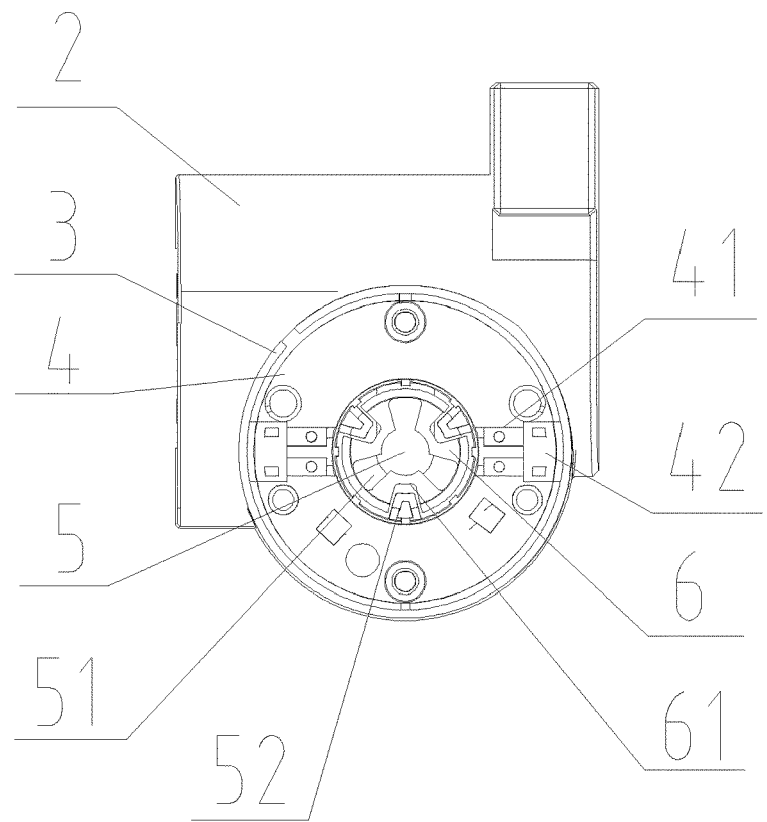
FIG. 2 is a structural schematic view of the lower driver cabinet.

As shown in FIGS. 1 and 2, the driver cabinet structure of the present invention includes an upper driver cabinet 1, a lower driver cabinet 2, a motor front-end cover 3, a motor brush rack plate 4 and a damping member 6. The motor front-end cover 3 is disposed on the lower driver cabinet 2. The motor brush rack plate 4 is disposed on the motor front-end cover 3, and two screw holes 31 are symmetrically disposed on a lateral surface. Two brush holders 41 are symmetrically disposed on the motor brush rack plate 4, and a through hole 5 is disposed in the center. Front and rear ends of each of the brush holders 41 are both open and intercommunicated. Brush holder end plugs 42 are coupled with the brush holders 41, are detachably connected with the brush holders 41. A limit step 51 is disposed in the through hole 5, and three lug bosses 52 are disposed on the limit step 51. The upper driver cabinet 1, the lower driver cabinet 2, the motor front-end cover 3, the motor brush rack plate 4 and the brush holders 41 are integrally formed. The damping member 6 is of an annular shape, is coupled with the through hole 5, and is provided on the edge with three notches 61 coupled with the lug bosses 52.

Installation ports 7 for installing a push rod and a slide rail are disposed on the upper driver cabinet 1 and the lower driver cabinet 2.

In order to prevent the damage of a carbon brush in the process of pressing a rotor assembly 9, the front and rear ends of each of the brush holders 41 are both open and intercommunicated; therefore, the rotor assembly 9 can be pressed in first, then the carbon brush and a spring are installed, and finally the brush holder end plugs 42 are used to limit the radial movement of the spring.

The motor front-end cover 3 is provided with screw holes 31 on the lateral surface, the screw holes 31 are coupled with screws 8 to reinforce a rotor bearing 10, so that the rotor bearing 10 is prevented from axially moving, and the problems occurred in subsequent use are avoided.

The damping member 6 is cooperatively disposed on the limit step 51 and the lug bosses 52 in the through hole 5, thus the self-locking function of the driver is improved, and the problems of high cost and easy damage of an existing steep-lead driver having the self-locking function are solved.

Figure 3:
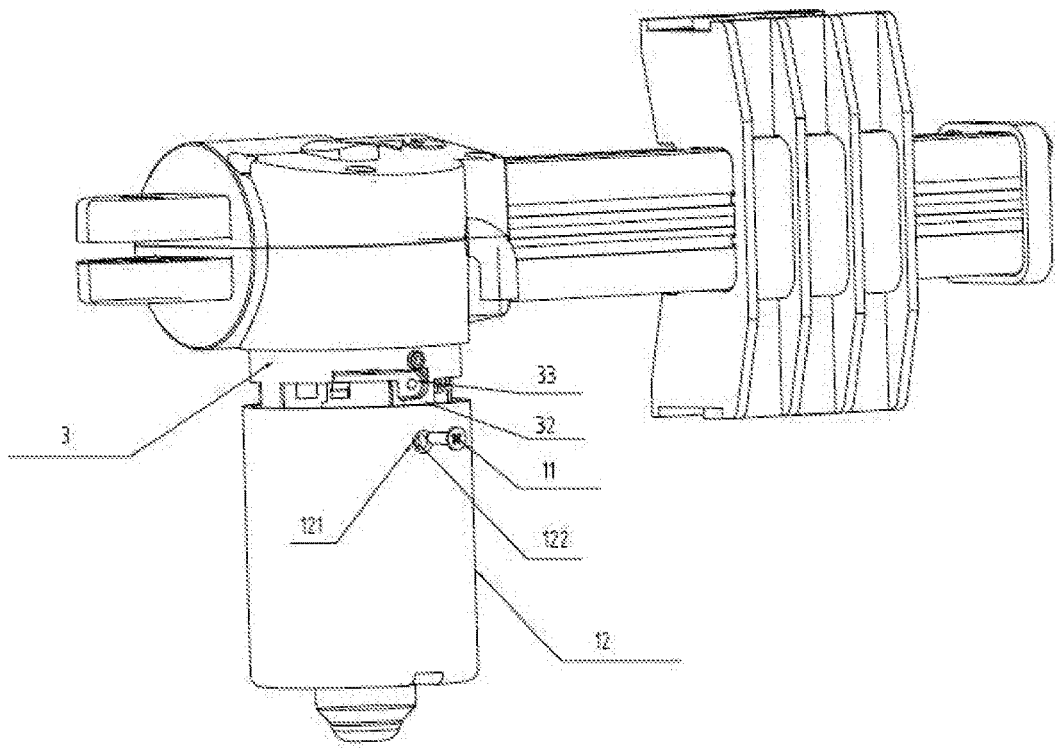
FIG. 3 is a schematic view showing the quick installation of the motor shell.

As shown in FIG. 3, a motor shell 12 is cooperatively disposed at the bottom of the motor front-end cover 3. A motor mechanism is installed in the motor shell 12. A radially arranged installation hole 33 is formed on the motor front-end cover 3; a rim 32 enclosing a half of the installation hole 33 is disposed on the periphery of the installation hole 33; an installation coupling through hole 121 is formed on a sidewall of the motor shell 12; a flange 122 surrounding the installation coupling through hole 121 is disposed on an inner wall of the sidewall of the motor shell 12; the rim 32 is provided with an opening for moving in and out the flange 122; as a preferred structure, the rim 32 is of a U shape; the outer diameter of the flange 122 is slightly smaller than an internal space of the rim 32; when the motor shell 12 and the motor front-end cover 3 are installed together, the flange 122 moves in from the opening, and is then limited by the rim 32; and a fastener 11 penetrates through the installation coupling through hole 121 and the installation hole 33 to fixedly connect the motor front-end cover 3 to the motor shell 12.

When the above-described installation structure is installed, first the motor front-end cover 3 gets close to the motor shell 12; then the motor front-end cover 3 or the motor shell 12 is rotated, and the flange 122 falls into and limited by the rim 32; and finally the fastener 11 is simply and quickly screwed in, speaking from structure, the motor shell 12 and the motor front-end cover 3 are not only fixed by fastening screws, but also positioned by a clamping structure, thus the entire installation structure is stable and reliable.

What is claimed is:

1. A driver cabinet structure, comprising an upper driver cabinet and a lower driver cabinet, and further comprising a motor front-end cover and a motor brush rack plate, wherein the motor front-end cover is disposed on the lower driver cabinet; the motor front-end cover is provided with the motor brush rack plate thereon and a screw hole on a lateral surface; the motor brush rack plate is provided with a brush holder thereon and a through hole in the center; a limit step is disposed in the through hole; lug bosses are disposed on the limit step; and the lower driver cabinet, the motor front-end cover, the motor brush rack plate and the brush holder are integrally formed; and, a motor shell is cooperatively disposed at a bottom of the motor front-end cover; a radially arranged installation hole is formed on the motor front-end cover; a rim enclosing a half of the installation hole is disposed on periphery of the installation hole; an installation coupling through hole is formed on a sidewall of the motor shell; a flange surrounding the installation coupling through hole is disposed on an inner wall of the sidewall of the motor shell; the rim is provided with an opening for moving in and out the flange; when the motor shell and the motor front-end cover are installed together, the flange moves in from the opening, and is then limited by the rim; and a fastener penetrates through the installation coupling through hole and the installation hole to fixedly connect the motor front-end cover to the motor shell.

2. The driver cabinet structure according to claim 1, wherein the upper driver cabinet, the lower driver cabinet, the motor front-end cover, the motor brush rack plate and the brush holder are integrally formed.

3. The driver cabinet structure according to claim 1, wherein the brush holder is cooperatively connected with a brush holder end plug.

4. The driver cabinet structure according to claim 3, wherein the brush holder end plug is detachably connected with the brush holder.

5. The driver cabinet structure according to claim 3, wherein the brush holder end plug and the brush holder are integrally formed.

6. The driver cabinet structure according to claim 1, further comprising a damping member, wherein the damping member is coupled with the through hole, and is provided on the edge with notches coupled with the lug bosses.

7. The driver cabinet structure according to claim 6, wherein number of the notches is an integral multiple of number of the lug bosses.

8. The driver cabinet structure according to claim 1, wherein at least one of the lug bosses is disposed on the limit step.

9. The driver cabinet structure according to claim 1, wherein slide rail installation ports coupled with each other are formed on the upper driver cabinet and the lower driver cabinet respectively.

10. The driver cabinet structure according to claim 1, wherein the rim is of a U shape, and an outer diameter of the flange is slightly smaller than an internal space of the rim.

* * * * *